US 6,541,536 B2

(12) United States Patent
Weikard et al.

(10) Patent No.: US 6,541,536 B2
(45) Date of Patent: Apr. 1, 2003

(54) POLYURETHANE DISPERSIONS

(75) Inventors: Jan Weikard, Odenthal (DE); Erhard Lühmann, Leverkusen (DE); Wolfgang Kremer, Kerken (DE); Jürgen Meixner, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 61 days.

(21) Appl. No.: 09/818,200

(22) Filed: Mar. 27, 2001

(65) Prior Publication Data
US 2001/0038918 A1 Nov. 8, 2001

(30) Foreign Application Priority Data
Apr. 3, 2000 (DE) .......................... 100 16 548

(51) Int. Cl.$^7$ .............................. C08G 18/64
(52) U.S. Cl. ................... 522/84; 522/86; 428/423.1; 428/425.1
(58) Field of Search ............. 428/423.1, 425.1; 522/84, 86

(56) References Cited

U.S. PATENT DOCUMENTS

| 4,153,778 A | * | 5/1979 | Park et al. | |
| 4,287,039 A | | 9/1981 | Buethe et al. | 204/159.19 |
| 5,684,081 A | | 11/1997 | Dannhorn et al. | 524/507 |
| 5,990,192 A | | 11/1999 | Gerlitz et al. | 522/93 |
| 6,207,744 B1 | | 3/2001 | Paulus et al. | 524/507 |

FOREIGN PATENT DOCUMENTS

| DE | 196 49 394 | 6/1998 |
| EP | 704461 | 4/1996 |
| EP | 872502 | 10/1998 |
| EP | 942022 | 9/1999 |
| JP | 5-263012 | 10/1993 |

* cited by examiner

*Primary Examiner*—Rachel Gorr
(74) *Attorney, Agent, or Firm*—Joseph C. Gil; Thomas W. Roy

(57) ABSTRACT

The present invention relates to radiation curable aqueous polyurethane dispersions containing 0.05 to 20 wt. %, based on the weight of the non-aqueous constituents of the aqueous polyurethane dispersions, of 2,2-dimethyl-3-hydroxypropionic acid-(2,2-dimethyl-3-hydroxypropyl ester), (HPSNPG, calculated as MW 204.3). The invention also relates to substrates coated with these polyurethane dispersions, in particular to coated wood substrates with good grain enhancing properties.

5 Claims, No Drawings

POLYURETHANE DISPERSIONS

BACKGROUND OF THE INVENTION

1. Field of the Invention

The present invention relates to aqueous polyurethane dispersions which cure under the action of high-energy radiation and coated substrates prepared with these dispersions, especially wood and furniture.

2. Description of the Prior Art

Radiation curable polyurethane dispersions are described in EP-A 0 704 469, EP-A 0 753 531, EP-A 0 870 788, EP-A 0 872 502 and EP-A 0 942 022. The polyurethane dispersions described therein exhibit good physical surface-drying once the water has evaporated, even before UV curing, and only slightly penetrate absorbent substrates such as wood. Thus, these coatings only inadequately emphasize the natural structure of the wood, a phenomenon known in the art as "grain enhancement" (*Römpp Lexikon der Lacke & Druckfarben*, Ulrich Zorl (ed.), Stuttgart, New York, Thieme 1998, "wood lacquers" entry, page 289).

EP-A-0 012 339 discloses aqueous dispersions based on radiation curable prepolymers, which are stabilized by dispersion additives such as polyvinylpyrrolidones. While these dispersions exhibit good grain enhancement on wood, they hardly surface-dry at all by releasing water, which is extremely unfavorable in an industrial coating process. This is because uncured lacquer surfaces are sensitive to dust and other disturbances which may occur during handling or movement. Also, the use of the dispersion additives means that some water remains in the film after the majority of water has evaporated, and this residual water may cause problems with the optical properties and hardness of the film on curing by UV light.

Therefore, the prior art systems either surface-dry physically, but exhibit inadequate grain enhancement, or they exhibit good grain enhancement, but insufficient surface drying.

An object of the present invention is to provide radiation curable aqueous polyurethane dispersions that exhibit both good physical surface drying before radiation curing and good grain enhancement on wood.

This object may be achieved in accordance with the invention by incorporating small quantities of 2,2-dimethyl-3-hydroxypropionic acid (2,2-dimethyl-3-hydroxypropyl ester) in radiation curable aqueous polyurethane dispersions. The presence of this compound surprisingly gives rise to greatly improved grain enhancement on wood in physically surface-drying, radiation curable aqueous polyurethane dispersions.

SUMMARY OF THE INVENTION

The present invention relates to radiation curable aqueous polyurethane dispersions containing 0.05 to 20 wt. %, based on the weight of the non-aqueous constituents of the aqueous polyurethane dispersions, of 2,2-dimethyl-3-hydroxypropionic acid-(2,2-dimethyl-3-hydroxypropyl ester) HPSNPG, calculated as MW 204.3.

The invention also relates to substrates coated with these polyurethane dispersions, in particular to coated wood substrates with good grain enhancing properties.

DETAILED DESCRIPTION OF THE INVENTION

The production of polyurethane dispersions is known and described, for example, in *Methoden der organischen Chemie* (Houben-Weyl, supplemental and additional volumes to the $4^{th}$ edition, volume E20, H. Bartl and J. Falbe (eds.), Stuttgart, New York, Thieme 1987, pp. 1659–1693). Polyurethane dispersions are produced by polyaddition of di- or polyisocyanates (component A) with di- or polyfunctional isocyanate-reactive compounds (component B). The reaction may be performed in one or more stages in the homogeneous phase or, in the case of a multistage reaction, in part in the aqueous phase. Once polyaddition has been performed completely or partially, a dispersion step is performed. Further polyaddition or modification in the disperse phase may optionally be performed.

Isocyanate-reactive component B) contains at least one hydrophilizing compound B1. Compounds having a dispersant action, which may be cationic, anionic and/or nonionic, hydrophilic ether groups. Examples of compounds B1 are those containing isocyanate-reactive groups and also containing sulfonium, ammonium, carboxylate or sulfonate groups, groups which may be converted into ionic groups by salt formation and/or containing polyether groups. Preferred isocyanate-reactive groups are hydroxyl and amino groups. Examples of compounds B1 are bis(hydroxymethyl) propionic acid, bis(hydroxymethyl)butyric acid, hydroxypivalic acid, malic acid, glycolic acid, lactic acid, glycine, alanine, taurine and 2-aminoethylaminoethanesulfonic acid. Also suitable are polyethylene glycols, polypropylene glycols, the block copolymers thereof started on alcohols and monomethyl ethers of these polyglycols. Bis (hydroxymethyl)propionic acid is particularly suitable.

Isocyanate-reactive component B) also contains at least one compound B2, which also contains free-radically polymerizable double bonds, preferably acrylates or methacrylates. Examples of these compounds include the mono (meth)acrylates of dihydric alcohols such as ethanediol, the isomeric propanediols and butanediols, or (meth)acrylates of polyhydric alcohols, such as trimethylolpropane, glycerol and pentaerythritol, which contain free hydroxyl groups. Polyester acrylates containing hydroxyl groups and having an OH content of 30 to 300 mg KOH/g may also be used.

Suitable monomer constituents that may be used during the production of the hydroxy-functional polyester acrylates include:

1. (Cyclo)alkanediols (i.e. dihydric alcohols with (cyclo) aliphatically bound hydroxyl groups) having a molecular weight of 62 to 286, such as ethanediol, 1,2- and 1,3-propanediol, 1,2-, 1,3- and 1,4-butanediol, 1,5-pentanediol, 1,6-hexanediol, neopentyl glycol, 1,4-cyclohexanedimethanol, 1,2- and 1,4-cyclohexanediol and 2-ethyl-2-butylpropanediol. Also suitable are diols containing ether groups such as diethylene glycol, triethylene glycol, tetraethylene glycol, dipropylene glycol, tripropylene glycol, and polyethylene glycols, polypropylene glycols or polybutylene glycols having a maximum molecular weight of about 2000, preferably about 1000 and more preferably about 500. Reaction products of these diols with ε-caprolactone or other lactones may also be used as diols.
2. Trihydric and higher functional alcohols having a molecular weight of 92 to 254, such as glycerol, trimethylolpropane, pentaerythritol, dipentaerythritol and sorbitol or polyethers started on these alcohols, for example, the reaction product of 1 mole of trimethylolpropane with 4 moles of ethylene oxide.
3. Monoalcohols such as ethanol, 1- and 2-propanol, 1- and 2-butanol, 1-hexanol, 2-ethylhexanol, cyclohexanol and benzyl alcohol.
4. Dicarboxylic acids having a molecular weight of 104 to about 600 and/or the anhydrides thereof, such as phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid and hydrogenated dimer fatty acids.

5. Higher functional carboxylic acids or the anhydrides thereof, such as trimellitic acid and trimellitic anhydride.
6. Monocarboxylic acids, such as benzoic acid, cyclohexanecarboxylic acid, 2-ethylhexanoic acid, caproic acid, caprylic acid, capric acid, lauric acid, natural and synthetic fatty acids.
7. Acrylic acid, methacrylic acid or dimeric acrylic acid.

Preferred polyester acrylates containing hydroxyl groups are the reaction product of at least one compound from group 1 or 2 with at least one compound from group 4 or 5 and at least one compound from group 7.

Groups with a dispersing action generally known from the prior art, such as those described for example in *Progress in Organic Coatings*, 9 (1981), 291–296 may also be incorporated into these polyester acrylates. A portion of polyethylene glycols and/or methoxypolyethylene glycols may thus be incorporated as the alcohol component. Other examples include polyethylene glycols, polypropylene glycols and the block copolymers thereof started on alcohols, and also monomethyl ethers of these polyglycols. A polyethylene glycol having a molecular weight of 1500 and/or a polyethylene glycol monomethyl ether having a molecular weight of 500 are particularly suitable.

It is also possible to react a portion of excess carboxyl groups, in particular those of (meth)acrylic acid, with mono-, di- or polyepoxides. This reaction may in particular be used to increase the OH value of the polyester acrylate because an OH group is formed for each epoxide/acid reaction. The acid value of the resulting product is below 20 mg KOH/g, preferably below 10 mg KOH/g and more preferably below 5 mg KOH/g.

The production of polyester acrylates is described in DE-A-4 040 290, DE-A-3 316 592 and P. K. T. Oldring (ed.), *Chemistry & Technology of UV & EB Formulations for Coatings, Inks & Paints*, vol. 2, 1991, SITA Technology, London, pp. 123–135.

Alternatively, known epoxy acrylates containing hydroxyl groups, polyether acrylates containing hydroxyl groups or polyurethane acrylates containing hydroxyl groups and having OH contents of 20 to 300 mg KOH/g may also be used, as well as mixtures thereof with each other and mixtures with unsaturated polyesters containing hydroxyl groups, mixtures with polyester acrylates, or mixtures with unsaturated polyesters containing hydroxyl groups and polyester acrylates. These compounds are also described in P. K. T. Oldring (ed.), *Chemistry & Technology of UV & EB Formulations for Coatings, Inks & Paints*, vol. 2, 1991, SITA Technology, London.

Isocyanate-reactive component B) optionally contains, as component B3, 2,2-dimethyl-3-hydroxypropionic acid (2,2-dimethyl-3-hydroxypropyl ester) in an amount such that the non-aqueous constituents of the polyurethane dispersion contain 0.05 to 20 wt. %, preferably 0.1 to 10 wt. %, and more preferably 0.5 to 5 wt. % of 2,2-dimethyl-3-hydroxypropionic acid (2,2-dimethyl-3-hydroxypropyl ester) (HPSNPG, calculated as MW 204.3). HPSNPG may also be incorporated as a reaction product with compounds containing isocyanate groups, e.g., it may be incorporated into the radiation curable polyurethane.

Isocyanate-reactive component B) may also contain, as component B4, less than 30 wt. %, preferably less than 10 wt. %, of diols with 2 to 10 carbon atoms. Examples include ethylene glycol, di- or triethylene glycol, 1,3- or 1,4-butanediol, neopentyl glycol, 1,6-hexanediol and mixtures thereof.

Isocyanate-reactive component B) may also contain, as component B5, less than 60 wt. %, preferably less than 30 wt. %, of higher molecular weight known di- or polyols having a number average molecular weight of 400 to about 8000, preferably 500 to 4000. Polymers having a hydroxyl functionality of about 2 are preferred. These polymers include polyester alcohols prepared from aliphatic, cycloaliphatic and/or aromatic di-, tri- and/or polycarboxylic acids with diols, triols and/or polyols, as well as lactone-based polyester alcohols; polyetherols prepared by polymerizing cyclic ethers or by reacting alkylene oxides with starter molecules; hydroxyl-terminated polycarbonates prepared by reacting diols, lactone-modified diols or bisphenols (such as bisphenol A) with phosgene or carbonic acid diesters such as diphenyl carbonate or dimethyl carbonate; hydroxyl-terminated polyamide alcohols; and hydroxyl-terminated polyacrylate diols such as Tegomer BD1000 (Tego GmbH, Essen).

Isocyanate-reactive component B) may also contain, as component B6, di- and/or polyamines to increase molecular weight and are preferably added towards the end of the polyaddition reaction. This reaction preferably proceeds in an aqueous medium. In this case, the di- and/or polyamines must be more reactive towards the isocyanate groups of component A) than water. Examples of suitable amines include ethylenediamine, 1,6-hexamethylenediamine, isophoronediamine, 1,3- and 1,4-phenylene-diamine, 4,4'-diphenylmethanediamine, amino-functional polyethylene oxides or polypropylene oxides (e.g., Jeffamine resins, D series, Huntsman Corp.), triethylenetetramine and hydrazine. Ethylenediamine is particularly preferred.

A portion of monoamines may also be added, such as butylamine, ethylamine and amino-functional polyethylene oxides and polypropylene oxides (e.g., Jeffamine resins, M series, Huntsman Corp.), Component A) is selected from aromatic, araliphatic, aliphatic or cycloaliphatic polyisocyanates and mixtures thereof. Examples of suitable polyisocyanates include butylene diisocyanate, hexamethylene diisocyanate (HDI), isophorone diisocyanate (IPDI), trimethylhexamethylene diisocyanate (2,2,4- and/or 2,4,4-trimethylhexamethylene diisocyanate), the isomeric bis(4,4'-isocyanatocyclohexyl)methanes, isocyanatomethyl-1,8-octane diisocyanate, 1,4-cyclohexylene diisocyanate, 1,4-phenylene diisocyanate, 2,4- and/or 2,6-tolylene diisocyanate, 1,5-naphthylene diisocyanate, 2,4'- and/or 4,4'-diphenylmethane diisocyanate and 4,4',4"-triphenylmethane triisocyanate. Also suitable are derivatives of the preceding polyisocyanates containing urethane, isocyanurate, allophanate, biuret, uretidione and/or iminooxadiazinedione groups. Hexamethylene diisocyanate, isophorone diisocyanate, the isomeric bis(4,4'-isocyanatocyclohexyl)methanes and mixtures thereof are preferred.

The polyurethane dispersions according to the invention may be produced using any known process, such as emulsifier/shear, acetone, prepolymer/mixing, melt/emulsification, ketimine and solid/spontaneous dispersion processes or derivatives thereof. These methods are summarized in *Methoden der organischen Chemie* (Houben-Weyl, supplemental and additional volumes to the 4$^{th}$ edition, volume E20, H. Bartl and J. Falbe (eds.), Stuttgart, New York, Thieme 1987, pp. 1671–1682). The melt/emulsification and acetone processes are preferred. The acetone process is particularly preferred.

Components A) and B) without B6 are initially introduced into a reactor to produce the intermediate products (prepolymers), if required by the process (for example, in the acetone process, optionally also in the melt/emulsification process). They are diluted with a solvent which is water-miscible but inert to isocyanate groups (in the melt/emulsification process preferably without a solvent), are heated to relatively high temperature, in particular from 50 to 120° C. Suitable solvents include acetone, butanone, tetrahydrofuran, dioxane, acetonitrile, dipropylene glycol dimethyl ether and 1-methyl-2-pyrrolidone. Catalysts known for accelerating the isocyanate addition reaction (such as triethylamine, 1,4-diazabicyclo[2.2.2]octane, tin dioctoate or dibutyltin dilaurate) may also be introduced with the initial mixture.

The polyisocyanate or polyisocyanates A) are added dropwise to these mixtures. The molar ratio of isocyanate groups in component A) to isocyanate-reactive groups in component B) is 1:1 to 1:5, preferably from 1:1.1 to 1:1.5. The reaction of component A) with component B) is performed to a degree of conversion of 65 to 100%, preferably of 80 to 100%, based on the NCO groups in (A). In one embodiment of the process, the reaction may be continued until the NCO content of the reaction mixture remains constant.

The degree of conversion is conventionally determined by monitoring the NCO content of the reaction mixture. This may be achieved both by spectroscopic measurements (IR or NIR spectra) and by chemical analysis (titration) of samples taken from the mixture. Once the desired NCO content has been reached, the rate of any further reaction of component A) with component B) is greatly reduced by reducing the temperature as rapidly as possible. The extent to which the reaction temperature must be reduced is determined by the reactants used (in particular, the reactivity of different isocyanates may vary greatly) and may be verified by continued monitoring of the NCO content of the mixture.

Once the prepolymers have been produced, salt formation of the potential anionic and cationic groups of the component B1 is performed, if this has not already been performed in the starting molecules. In the case of anionic groups, bases (such as ammonia, triethylamine, triethanolamine, potassium hydroxide or sodium carbonate) may advantageously be used, while in the case of cationic groups, dimethyl sulfate or succinic acid may advantageously be used. If compounds B1 only contain ether groups, the neutralization step is omitted.

In the final reaction step of one embodiment, in which an increase in molecular weight and the formation of the polyurethane dispersions according to the invention occur in the aqueous medium, the prepolymers are either introduced into the dispersion water, which contains the polyamine or polyamines B6, optionally with application of strong shear forces, such as vigorous stirring, or, the dispersion water/polyamine D mixture is stirred into the prepolymers. The increase in molecular weight then proceeds by the reaction of the isocyanate groups still present in the prepolymers with the amino groups from component B6 to form the dispersions according to the invention.

The quantity of polyamine B6 is dependent upon the unreacted isocyanate groups still present. It is not necessary to react all the isocyanate groups still present with polyamines B6. The unreacted isocyanate groups then react slowly with water. Preferably, more than 50%, more preferably more than 75% of the isocyanate groups are reacted with polyamines B6.

In one embodiment of the process, the amount of amino groups added is sufficient to react more than 100% to 180%, preferably 101 to 120%, of the previously unreacted isocyanate groups. In this case, some amino groups remain unreacted.

In another variant of the process, the dispersion step may be performed first and then component (B6), advantageously diluted in water, is added.

If desired, any organic solvent present may be removed by distillation. The resulting dispersions have a solids content of 20–60 wt. %, preferably 30 to 55 wt. %.

Once water has evaporated, the polyester acrylate urethane dispersions according to the invention yield dry to hard and mechanically loadable coatings even without addition of additives. During subsequent crosslinking induced by radiation-chemical and/or free-radical means, the films cure fully to yield particularly high quality, scratch-resistant and chemical resistant coatings.

UV curing is particularly preferred among radiation-chemically induced polymerization (UV, electron, X-ray or gamma radiation). UV curing is performed in the presence of photoinitiators. Suitable photoinitiators include aromatic ketone compounds such as benzophenones, alkylbenzophenones, 4,4'-bis(dimethylamino)-benzophenone (Michler's ketone), anthrone and halogenated benzophenones. Also suitable are acyl phosphine oxides such as 2,4,6-trimethylbenzoyidiphenyl phosphine oxide, phenyl glyoxylic acid esters, anthraquinone and derivatives thereof, benzil ketals and hydroxyalkylphenones are also suitable. Mixtures of these compounds may also be used.

When curing by free-radical means, water-soluble peroxides or aqueous emulsions of water-insoluble initiators are suitable. These free radical formers may be combined in known manner with accelerators.

The polyurethane dispersions according to the invention may be applied to suitable substrates by known methods, such as spraying, roll coating, knife coating, flooding, brushing or dipping. If the polyurethane dispersions according to the invention are applied to wood, surfaces are obtained which are distinguished by particularly good surface optical properties and emphasis of the natural markings of the wood (grain enhancement). The polyurethane dispersions according to the invention are thus particularly suitable for primers, for example, in multilayer coating of pre-finished parquet flooring. The primers may then be overcoated with other coating compositions known for coating parquet flooring, such as aqueous UV curable polyurethane dispersions or 100% UV curable polyester acrylates and/or urethane acrylates.

Other absorbent substrates (such as paper, paperboard or leather), metals, plastics and precoated substrates may also be coated with the polyurethane dispersions according to the invention.

The polyurethane dispersions according to the invention may be used as the sole lacquer binder or they may be combined with other binders and additives known from lacquer technology, such as dispersions, pigments, dyes or flatting agents. In particular, combinations with other polyurethane dispersions or with polyacrylate dispersions are preferred.

EXAMPLES

Example 1

Dispersion A (Comparison Example According to EP-A-0 753 531, U.S. Pat. No. 5,684,081)

342.9 g of a polyester acrylate (Laromer PE 44F, BASF AG, Ludwigshafen, DE), 57.1 g of a polyester acrylate (IRR 322, UCB S. A., Drogenbos, B E), 10.4 g of neopentyl glycol, 26.80 g of dimethylolpropionic acid, 0.6 g of dibutyltin dilaurate and 194.0 g of acetone were initially introduced into a reactor equipped with a stirrer, internal thermometer and gas inlet (air stream 2 to 3 l/h). 102.1 g of isophorone diisocyanate (Desmodur I, Bayer AG, Leverkusen, DE) and 50.4 g of hexamethylene diisocyanate (Desmodur H, Bayer AG, Leverkusen, DE) were then added and heated such that constant acetone refluxing was obtained. The mixture was stirred at this temperature until the reaction mixture had an NCO content of 2.0±0.1 wt. %.

The temperature was then reduced to 40° C. and 20.2 g of triethylamine were rapidly added. After 10 minutes the reaction mixture was poured with rapid stirring into 1170.0 g of water at 20° C. Once the dispersion had formed, 10.2 g of ethylenediamine in 30.0 g of water were added.

After stirring for 30 minutes without heating or cooling, the product was distilled under a vacuum (50 mbar, max. 50° C.) until a solids content of 37±2 wt. % was obtained.

Example 2

Dispersion B According to the Invention 342.9 g of a polyester acrylate (Laromer PE 44F, BASF AG, Ludwigshafen, DE), 57.1 g of a polyester acrylate (IRR 322, UCB S.A., Drogenbos, BE), 9.4 g of neopentyl glycol, 1.8 g of 2,2-dimethyl-3-hydroxypropionic acid-(2,2-dimethyl-3-hydroxypropyl ester), (BASF AG, Ludwigshafen, DE), 26.80 g of dimethylolpropionic acid, 0.6 g of dibutyltin dilaurate and 194.0 g of acetone were initially introduced into a reactor equipped with a stirrer, internal thermometer and gas inlet (air stream 2 to 3 l/h). 102.1 g of isophorone diisocyanate (Desmodur I, Bayer AG, Leverkusen, DE) and 50.4 g of hexamethylene diisocyanate (Desmodur H, Bayer AG, Leverkusen, DE) were then added and heated such that constant acetone refluxing was obtained. The mixture was stirred at this temperature until the reaction mixture had an NCO content of 2.0±0.1 wt. %.

The temperature was then reduced to 40° C. and 20.2 g of triethylamine were rapidly added. After 10 minutes the reaction mixture was poured with rapid stirring into 1170.0 g of water at 20° C. Once the dispersion had formed, 10.2 g of ethylenediamine in 30.0 g of water were added.

After stirring for 30 minutes without heating or cooling, the product was distilled under a vacuum (50 mbar, max. 50° C.) until a solids content of 37±2 wt. % was obtained.

Example 3

Dispersion C According to the Invention 400.0 g of a polyester acrylate (Laromer PE 44F, BASF AG, Ludwigshafen, DE) having an OH number of about 80 mg KOH/g, together with 10.4 g of neopentyl glycol, 1.0 g of 2,2-dimethyl-3-hydroxypropionic acid(2,2-dimethyl-3-hydroxypropyl ester), (BASF AG, Ludwigshafen, DE), 26.80 g of dimethylolpropionic acid, 0.6 g of dibutyltin dilaurate and 186.3 g of acetone were initially introduced into a reactor equipped with a stirrer, internal thermometer and gas inlet (air stream 2 to 3 l/h). 101.8 g of isophorone diisocyanate (Desmodur I, Bayer AG, Leverkusen, DE) and 51.1 g of hexamethylene diisocyanate (Desmodur H, Bayer AG, Leverkusen, DE) were then added and heated such that constant acetone refluxing was obtained. The mixture was stirred at this temperature until the reaction mixture had an NCO content of 2.0±0.1 wt. %.

The temperature was then reduced to 40° C. and 20.2 g of triethylamine were rapidly added. After 10 minutes the reaction mixture was poured with rapid stirring into 1030.0 g of water at 20° C. Once the dispersion had formed, 9.9 g of ethylenediamine in 30.0 g of water were added.

After stirring for 30 minutes without heating or cooling, the product was distilled under a vacuum (50 mbar, max. 50° C.) until a solids content of 38±2 wt. % was obtained.

Practical Examples

|  |  | A (Comparison) | B | C |
|---|---|---|---|---|
| Solids content | 1) | 38.7 wt. % | 36.5 wt. % | 37.5 wt.% |
| pH | 2) | 8.6 | 8.7 | 8.6 |
| Viscosity | 3) | 25 mPas. | 30 mPas | 26 mPas |
| Appearance of dispersion | 4) | slightly colloidal | slightly colloidal | slightly colloidal |
| Physical surface-drying | 5) | 12 | 18 | 15 |
| Pendulum hardness | 6) | a) 153 b) 143 c) 124 | a) 161 b) 146 c) 135 | a) 165 b) 165 c) 140 |
| Particle size | 7) | 91 | 94 | 54 |
| Grain enhancement | 8) | 5 | 3 | 2 |
| Water resistance | 9) | 0 | 0 | 0 |
| Ethanol resistance | 10) | 0 | 0 | 0 |

1) DIN EN ISO 3251 (1 g, 125° C.)
2) DIN 53785
3) Rotational viscosimeter, 23° C.
4) Visual evaluation
5) Binder dispersion+1.5% Irgacure 500 additive Ciba Specialties, Lampertheim, DE); wet film 150 μm; 60 min drying at 20–23° C.; König pendulum hardness measured.
6) Binder dispersion+1.5% Irgacure 500 additive (Ciba Specialties, Lampertheim, DE); wet film 150 μm; 60 min drying at 20–23° C.; UV curing, Hg lamp 80 W/cm a) feed rate 3 m/min; b) feed rate 5 m/min; c) feed rate 10 m/min; König pendulum hardness measured.
7) Average particle size by laser correlation spectroscopy: Zeta-sizer 1000, Malvern Instruments, Malvern, UK.
8) Film application on walnut, see note 6); visual evaluation with ratings: rating 0=best result; rating 5=poorest result. In order to ensure better comparability, several commercially available aqueous, radiation curable binders were concurrently tested and evaluated.
   1. Laromer PE 55W polyester acrylate (BASF AG, Ludwigshafen, DE) in protective colloid emulsion without physical surface-drying: grain enhancement rating 0;
   2. IRR 400 PU dispersion (UCB S.A., Drogenbos, BE), physically surface-drying: grain enhancement rating 4;
   3. Ucecoat DW 7770 PU dispersion (UCB S.A., Drogenbos, BE), physically surface-drying: grain enhancement rating 5;
   4. NeoRad R450 PU dispersion (Zeneca Resins, Waalwijk, NL), physically surface-drying: grain enhancement rating 5.
9) Cross-coat application with box knife coater; 2*150 μm wet film on maple with intermediate drying and sanding between coats, see note 6); 16 hours exposure (c.f. DIN 68861) (2*=two films).
10) See note 9).

A comparison of dispersions A and B demonstrates that the incorporation of small quantities of 2,2-dimethyl-3-hydroxypropionic acid (2,2-dimethyl-3-hydroxypropyl ester) into dispersion B brings about a distinct improvement in grain enhancement on wood, while still obtaining good physical surface-drying properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A radiation curable aqueous polyurethane dispersion containing 0.05 to 20 wt. %, based on the weight of the non-aqueous constituents of the aqueous polyurethane dispersion, of 2,2-dimethyl-3-hydroxypropionic acid (2,2-dimethyl-3-hydroxypropyl ester) (calculated as MW 204.3), which is chemically incorporated into the radiation curable polyurethane.

2. The radiation curable aqueous polyurethane dispersion of claim 1 wherein the polyurethane is prepared from a hydroxyl group containing polymer having an OH number of 30 to 300 mg KOH/g and comprising a member selected from the group consisting of polyester acrylates, epoxy acrylates, polyether acrylates, urethane acrylates and unsaturated polyesters.

3. The radiation curable aqueous polyurethane dispersion of claim 1 wherein the polyurethane is prepared from a hydroxyl group containing polymer having an OH number of 40 to 200 mg KOH/g and comprising a member selected from the group consisting of polyester acrylates and epoxy acrylates.

4. A substrate coated with the radiation curable aqueous polyurethane dispersion of claim 1.

5. A wood substrate coated with the radiation curable aqueous polyurethane dispersion of claim 1, in which the coating provides good grain enhancing properties to the wood substrate.

* * * * *